UNITED STATES PATENT OFFICE.

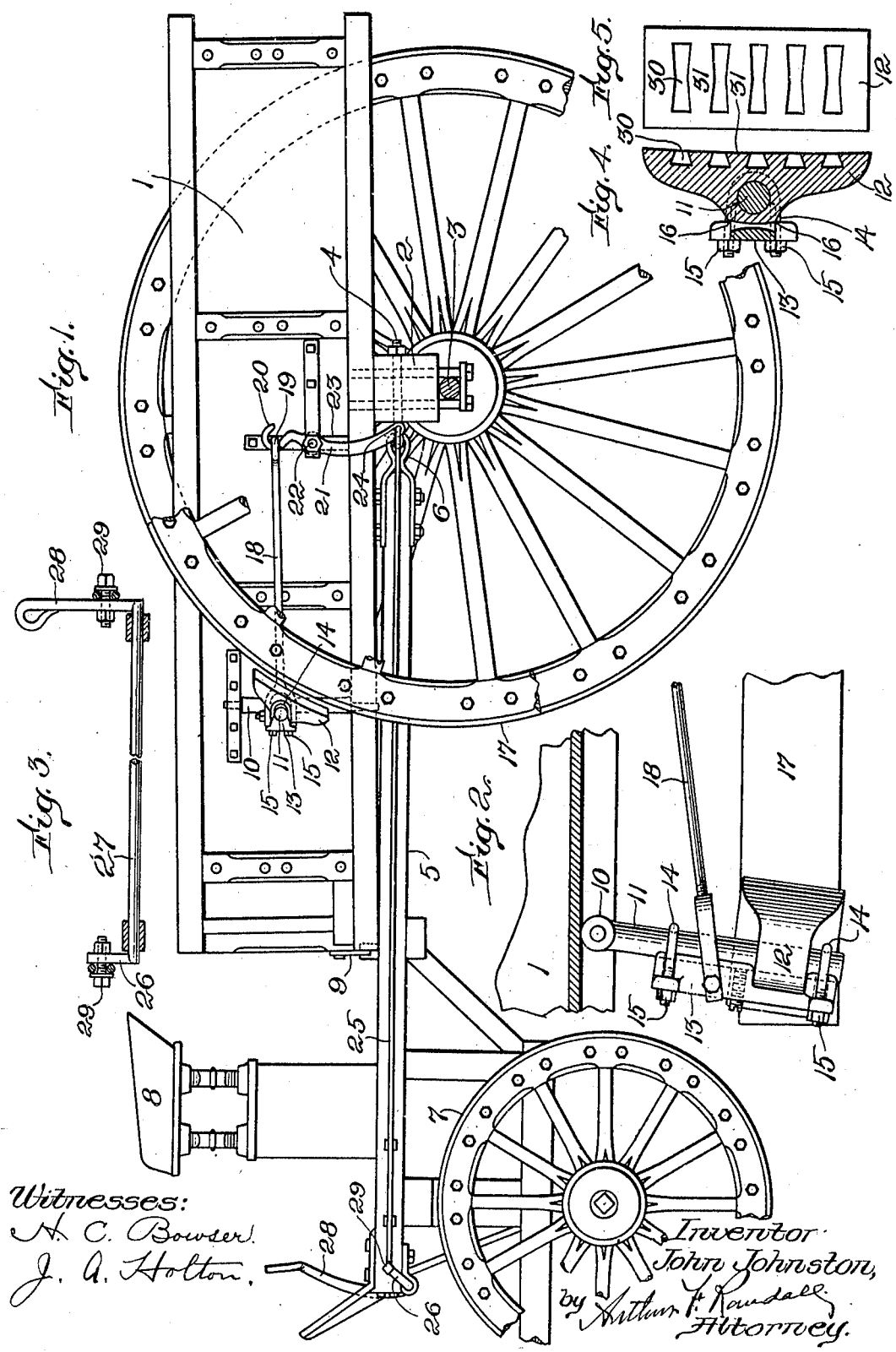

JOHN JOHNSTON, OF HYDE PARK, MASSACHUSETTS, ASSIGNOR TO J. JOHNSTON COMPANY, OF HYDE PARK, MASSACHUSETTS, A CORPORATION OF MASSACHUSETTS.

VEHICLE.

945,169. Specification of Letters Patent. Patented Jan. 4, 1910.

Application filed January 28, 1909. Serial No. 474,793.

*To all whom it may concern:*

Be it known that I, JOHN JOHNSTON, a citizen of the United States, residing at Hyde Park, in the county of Norfolk, and State of Massachusetts, have invented certain new and useful Improvements in Vehicles, of which the following is a specification.

My invention relates to dumping vehicles and particularly to dump carts, its object being to provide an improved vehicle of this class.

The distinguishing feature of my invention consists in providing the vehicle with a suitably supported wheel-engaging shoe movable into and out of engagement with one of the wheels of the vehicle and adapted when in engagement with the wheel to be acted upon by the rotary movement of the same so as to dump the vehicle, and means for operating said shoe.

In the best form of my invention, shown in the accompanying drawings, the vehicle is made with a tilting body on which the shoe is mounted with provision for movement toward and from one of the wheels of the vehicle. Means is provided on the tilting body of the vehicle for shifting the shoe toward and from the wheel and said shifting means is pivotally connected with an operating device mounted in the perch or frame of the vehicle and controlled by the driver of the latter, the pivotal joint which connects the operating device on the perch or frame of the vehicle with the shoe shifting means on the tilting body being arranged opposite the axis on which the body tilts so that the tilting movements of the body relatively to the perch or frame do not act to operate the shoe.

Other features of my invention are hereinafter pointed out.

Figure 1 is a side elevation partly broken away of one form of my invention. Fig. 2 is a fragmentary view in plan showing the brake shoe, its movable support and part of one of the wheels of the vehicle shown in Fig. 1. Fig. 3 is a detail of part of the operating device hereinafter described. Figs. 4 and 5 are details of the brake shoe and are hereinafter described.

Having reference to the drawings, the body 1 of my improved vehicle is made with an axle bed 2 to the under side of which the axle 3 is rigidly fixed. The bed 2 is provided with eyebolts, one of which is shown at 4, to which the rear end of the perch or frame 5 is pivotally connected by straps 6 fastened to the perch or frame 5. At its forward end the perch or frame 5 is supported by wheels 7 and provided with a driver's seat 8, as usual. The body 1 is detachably connected at 9 with the perch or frame 5 in the ordinary manner, so that they may be disconnected at this point when it is desired to tilt the body to dump the contents thereof, and when the body is thus tilted it turns, relatively to the perch or frame 5, on an axis passing through the sockets of the straps 6.

Pivotally mounted upon the body 1 is a shoe support 10 made with a laterally extending arm 11 on which is mounted the shoe 12. The shoe 12 is free to oscillate on arm 11 to a limited extent but is prevented from moving lengthwise on arm 11 by a yoke 13 rigidly and adjustably fastened to the arm 11 by two straps 14 which embrace said arm and have their extremities threaded to receive nuts 15. The back of the shoe 12 is made with surfaces 16 coöperating with the yoke 13 to hold the shoe in operative position with relation to the rear wheel 17 with which it coöperates, and at the same time said shoe is left free to oscillate on arm 11 to a limited extent so that it will fit itself to the wheel 17 when brought into engagement with the latter as hereinafter described.

Pivotally connected with the yoke 13 is a link 18 whose rear end is made with an eye 19 engaged by a hook 20 at the upper end of a lever 21 fulcrumed at 22 upon a bracket 23 fastened to the body 1.

Support 10, link 18 and lever 21 constitute the brake shifting means referred to above. The lower end of the lever 21 is pivotally connected at 24 to the rear end of a link 25 which is pivotally connected at its front end to an arm 26 projecting from one end of a rock shaft 27 journaled in bearings at the front end of the perch or frame 5. At the opposite end of the rock shaft 27 there is provided a lever 28 adapted to be operated by the foot of the driver. The opposite side of the vehicle is provided with a duplicate apparatus whereof the forward end of the rod corresponding to the rod 25 is connected at 29 to the foot lever 28. When it is desired to stop or retard the progress of the vehicle the driver shoves the lever 28 forward with his foot thereby swinging lever 21 in a direction to apply the brake shoe 12 to the periphery of wheel 17. The removal of the driver's foot from the lever 28 relieves the pressure of shoe 12 and allows the parts to return to normal position assisted if desired, by a spring (not shown).

When it is desired to dump the vehicle the body 1 is disconnected from the perch or frame 5 at 9, the brake shoe 12 is applied as before and then the driver backs the vehicle. As the vehicle moves backward the frictional engagement between the shoe and wheel causes the shoe to travel with the wheel and since the shoe is connected through the support 10 with the body 1 the latter is tilted backward and the contents thereof dumped out. By maintaining the pressure of the foot upon the lever 28 and driving the vehicle forward the body is restored to its normal position.

In order to prevent the movement of the brake shifting means with the body from operating the brake or disturbing its condition, the pivotal connection 24 is so arranged with relation to the axis around which the body swings that when the brake is in its applied position said pivotal connection is opposite or substantially opposite said axis. Therefore, as the body swings on its axis carrying the brake shifting lever 21 with it, the position of the latter with relation to the body 1 is not disturbed and consequently the shoe 12 and foot lever 28 are not affected by such movement of the body.
In applying the brake to retard or stop the vehicle while it is moving backward the connection 9 holds the body against tilting. That is, unless the connection 9 is removed, backward movement of the vehicle while the brake is set, is either retarded or prevented, the brake acting to tilt the body only in the absence of the connection 9.

The face of the brake shoe 12 is made up of alternating pockets 30 and wheel engaging surfaces 31. In practice the pockets 30 fill up with grit, earth and the like, which packs solidly into the pockets and, combined with the surfaces 31, provides a very effective gripping surface.
The brake apparatus of my improved vehicle is of simple strong and inexpensive construction, powerful in its action, and can be applied to vehicles of otherwise ordinary construction.
The distance between wheel 17 and body 1 varies in different vehicles but by adjusting the shoe 12 and yoke 13 on arm 11 the apparatus may be adapted to different vehicles without requiring a specially made support for the shoe.

What I claim is:—

1. A vehicle of the class described comprising a tilting body; a brake shoe mounted on said body with provision for movement into and out of engagement with one of the wheels of the vehicle; a frame with relation to which the body swings when it is tilted; and means on said frame for operating the shoe.

2. A vehicle of the class described comprising a tilting body; a brake shoe mounted on said body with provision for movement into and out of engagement with one of the wheels of the vehicle; means on said body for shifting the shoe into and out of engagement with said wheel; a frame with relation to which the body swings when it is tilted; a removable connection between the frame and body to normally hold the latter against tilting, and means on said frame for operating the shifting means.

3. A vehicle of the class described comprising a tilting body; a brake shoe mounted on said body with provision for movement into and out of engagement with one of the wheels of the vehicle; means on said body for shifting the shoe into and out of engagement with said wheel, said means comprising a member movably mounted on the body; a frame with relation to which the body swings when it is tilted; and means on said frame for operating the shoe shifting means, said last mentioned means comprising a movable member pivotally connected to the movable member on the body.

4. A vehicle of the class described comprising a tilting body; a brake shoe mounted on said body with provision for movement into and out of engagement with one of the wheels of the vehicle; means on said body for shifting the shoe into and out of engagement with said wheel, said means comprising a member movably mounted on the body; a frame with relation to which the body swings when it is tilted; and means on said frame for operating the shoe shifting means, said last mentioned means comprising a movable member connected to the movable member on the body so as to provide for relative movement between the two members when the body is tilted.

5. A vehicle of the class described comprising a tilting body; a brake shoe mounted on said body with provision for movement into and out of engagement with one of the wheels of the vehicle; means on said body for shifting the shoe into and out of engagement with said wheel, said means comprising a member movably mounted on the body; a frame with relation to which the body swings when it is tilted; and means on said frame for operating the shoe shifting means, said last mentioned means comprising a movable member pivotally connected to the movable member on the body at a point opposite the axis on which the body swings.

6. A vehicle of the class described comprising a tilting body; a brake shoe mounted on said body with provision for movement into and out of engagement with one of the wheels of the vehicle; means on said body for shifting the shoe into and out of engagement with said wheel, said means comprising a member movably mounted on the body; a frame with relation to which the body swings when it is tilted; and means on said frame for operating the shoe shifting means, said last mentioned means comprising a movable member pivotally connected to the movable member on the body at a point which occupies a position opposite the axis on which the body swings when said shoe is in engagement with the wheel.

7. In combination, the pivoted support 10 made with an arm 11; the yoke 13 mounted on arm 11; means to fasten yoke 13 to arm 11 with provision for adjustment lengthwise thereof, and the shoe 12 on arm 11 embraced by yoke 13.

In testimony whereof I have affixed my signature, in presence of two witnesses.

JOHN JOHNSTON.

Witnesses:
    ARTHUR F. RANDALL,
    G. A. ROCKWELL.